United States Patent
Kapsenberg et al.

(10) Patent No.: US 12,372,629 B2
(45) Date of Patent: Jul. 29, 2025

(54) MULTI-CHIP DAISYCHAIN FOR OUTPUT AGGREGATION

(71) Applicant: Waymo LLC, Mountain View, CA (US)

(72) Inventors: Pieter Kapsenberg, Santa Clara, CA (US); Pierre-Yves Droz, Los Altos, CA (US); Sabareeshkumar Ravikumar, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 572 days.

(21) Appl. No.: 17/644,664

(22) Filed: Dec. 16, 2021

(65) Prior Publication Data
US 2023/0194677 A1   Jun. 22, 2023

(51) Int. Cl.
*G01S 7/4863* (2020.01)
*B60W 60/00* (2020.01)
*G06F 13/36* (2006.01)

(52) U.S. Cl.
CPC ............ *G01S 7/4863* (2013.01); *G06F 13/36* (2013.01); *B60W 60/001* (2020.02); *B60W 2420/408* (2024.01)

(58) Field of Classification Search
CPC ...... G01S 7/4863; G01S 17/89; G01S 17/931; G06F 13/36; B60W 60/001; B60W 2420/408
USPC ......................................................... 356/335
See application file for complete search history.

(56) References Cited

U.S. PATENT DOCUMENTS

| | | | |
|---|---|---|---|
| 6,608,296 B1 * | 8/2003 | Toyoda | H04N 25/00 250/214 R |
| 6,970,196 B1 * | 11/2005 | Ishikawa | G06T 1/20 348/222.1 |
| 9,690,079 B2 | 6/2017 | Laroia | |
| 10,164,839 B2 | 12/2018 | Tsuchiya et al. | |
| 10,379,540 B2 | 8/2019 | Droz et al. | |
| 10,698,114 B2 | 6/2020 | Keilaf et al. | |

(Continued)

FOREIGN PATENT DOCUMENTS

CN   101208563   6/2008

OTHER PUBLICATIONS

Batten et al., "Designing Chip-Level Nanophotonic Interconnection Networks," IEEE Journal on Emerging and Selected Topics in Circuits and Systems, Jun. 2012, pp. 137-153, vol. 2, No. 2.

(Continued)

*Primary Examiner* — Md M Rahman
(74) *Attorney, Agent, or Firm* — McDonnell Boehnen Hulbert & Berghoff LLP

(57) ABSTRACT

An optical receiver may include a plurality of photodetectors, a common processed data pipeline, and a plurality of processors. Outputs of the plurality of processors are communicatively coupled to the common processed data pipeline. Each processor is configured to accept input signals from a respective photodetector of the plurality of photodetectors. Each processor is also configured to process the input signals to provide processed data and output the processed data into a data stream of the common processed data pipeline according to one or more predetermined data locations. A method for using the optical receiver and a non-transitory computer readable medium are also described.

20 Claims, 12 Drawing Sheets

(56) References Cited

U.S. PATENT DOCUMENTS

| | | |
|---|---|---|
| 10,892,830 B1 | 1/2021 | Liang et al. |
| 11,138,015 B2 | 10/2021 | Breslow |
| 11,823,461 B1* | 11/2023 | Song .................... G01C 21/265 |
| 2007/0198873 A1 | 8/2007 | Ward et al. |
| 2012/0076509 A1 | 3/2012 | Gurovich et al. |
| 2012/0120256 A1 | 5/2012 | Hwang et al. |
| 2019/0349089 A1 | 11/2019 | Brandt-Pearce et al. |
| 2020/0002115 A1 | 1/2020 | Kanno |
| 2020/0312156 A1 | 10/2020 | Sakamaki et al. |
| 2021/0014396 A1 | 1/2021 | Halstead et al. |
| 2021/0105160 A1* | 4/2021 | Lo ......................... H04L 1/0041 |
| 2022/0284619 A1* | 9/2022 | Brizzi .................... G06V 20/58 |
| 2023/0112050 A1* | 4/2023 | Askeland ............... G07C 5/085 |
| | | 701/27 |

OTHER PUBLICATIONS

Lorenzen et al., "Stepping into next-generation architectures for multi-camera operations in automobiles, " Texas Instruments, Jun. 2017, 13 pages.

Wei et al., "LiDAR and Camera Detection Fusion in a Real-Time Industrial Multi-Sensor Collision Avoidance System," Electronics, 2018, 32 pages, vol. 7, No. 6.

* cited by examiner

MULTI-CHIP DAISYCHAIN FOR OUTPUT AGGREGATION

BACKGROUND

Unless otherwise indicated herein, the description in this section is not prior art to the claims in this application and is not admitted to be prior art by inclusion in this section.

Autonomous vehicles, semi-autonomous vehicles, vehicles operating in an autonomous mode, and/or vehicles operating in a semi-autonomous mode may use various sensors to detect their surroundings. For example, light detection and ranging (lidar) devices, radio detection and ranging (radar) devices, and/or cameras may be used to identify objects in environments surrounding autonomous or semi-autonomous vehicles. Such sensors may be used in object detection and avoidance and/or in navigation, for example.

SUMMARY

This disclosure relates to optical receivers of lidar systems and associated methods of their use.

A non-limiting example of such an optical receiver could include a particular arrangement of: a) a plurality of photodetectors; b) a common processed data pipeline; and c) a plurality of processors. Namely, in an example embodiment, the plurality of processors could accept input signals from the plurality of photodetectors. The plurality of processors could be configured to perform image processing and/or other data manipulation on the input signals. Additionally, the outputs of the plurality of processors could be coupled to the common processed data pipeline in a serial, chain-like, arrangement. In various example embodiments, data processed by the processors could be output to a data stream of the common processed data pipeline in an out-of-order manner. In such scenarios, fully-populated data streams can be more reliably and more efficiently provided in lidar applications. The processors need not be physically located in a particular order or location because entry into the data pipeline can occur in a predetermined manner and/or according to a predetermined entry pattern without need for a shared memory buffer.

In a first aspect, an optical receiver is provided. The optical receiver includes a plurality of photodetectors. The optical receiver also includes a common processed data pipeline. The optical receiver additionally includes a plurality of processors. Outputs of the plurality of processors are communicatively coupled to the common processed data pipeline. Additionally, each processor could be configured to: accept input signals from a respective photodetector of the plurality of photodetectors, process the input signals to provide processed data, and output the processed data into a data stream of the common processed data pipeline according to one or more predetermined data locations.

In a second aspect, a method is provided. For each processor of a plurality of processors of an optical receiver, the method includes accepting input signals from a respective photodetector of a plurality of photodetectors, processing the input signals to provide processed data, and outputting the processed data into a data stream of a common processed data pipeline according to one or more predetermined data locations.

In a third aspect, a non-transitory computer-readable medium having encoded thereon instructions executable to carry out operations for providing a fully populated data stream in a common processed data pipeline based on outputs from a plurality of processors could be provided. The operations include, for each processor of the plurality of processors: accepting input signals from a respective photodetector of a plurality of photodetectors, processing the input signals to provide processed data, and outputting the processed data into a data stream of the common processed data pipeline according to one or more predetermined data locations.

These as well as other aspects, advantages, and alternatives will become apparent to those of ordinary skill in the art by reading the following detailed description, with reference, where appropriate, to the accompanying drawings.

DETAILED DESCRIPTION

Figure 1:
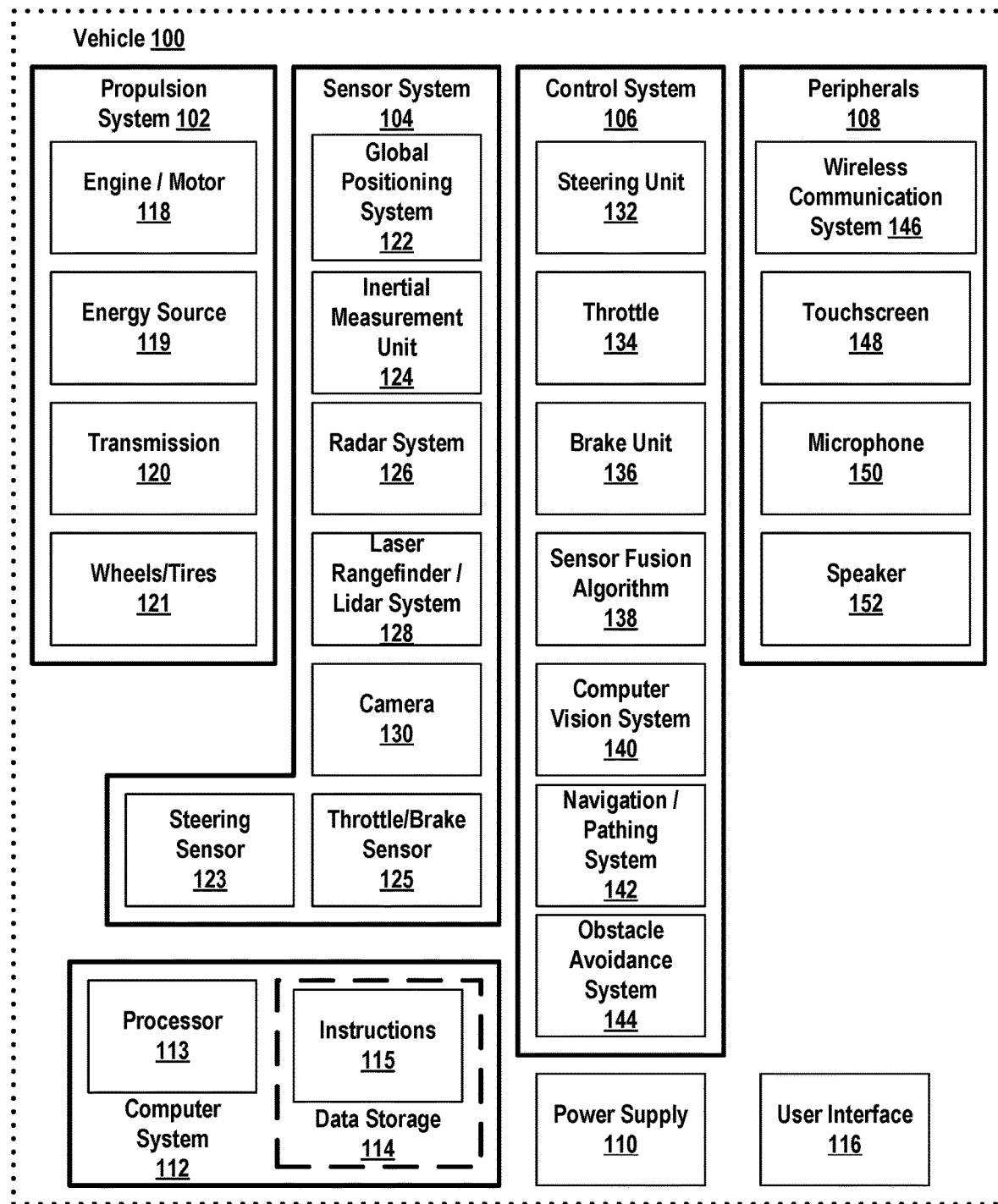
FIG. 1 is a functional block diagram illustrating a vehicle, according to example embodiments.
Figure 2A:
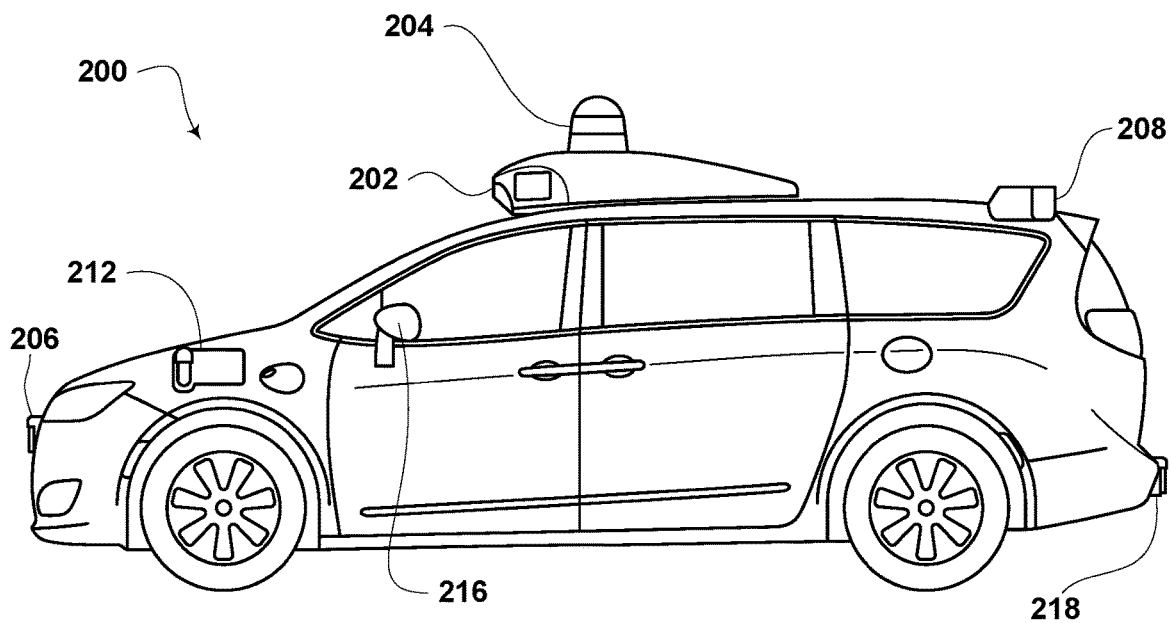
FIG. 2A is an illustration of a physical configuration of a vehicle, according to example embodiments.
Figure 2B:
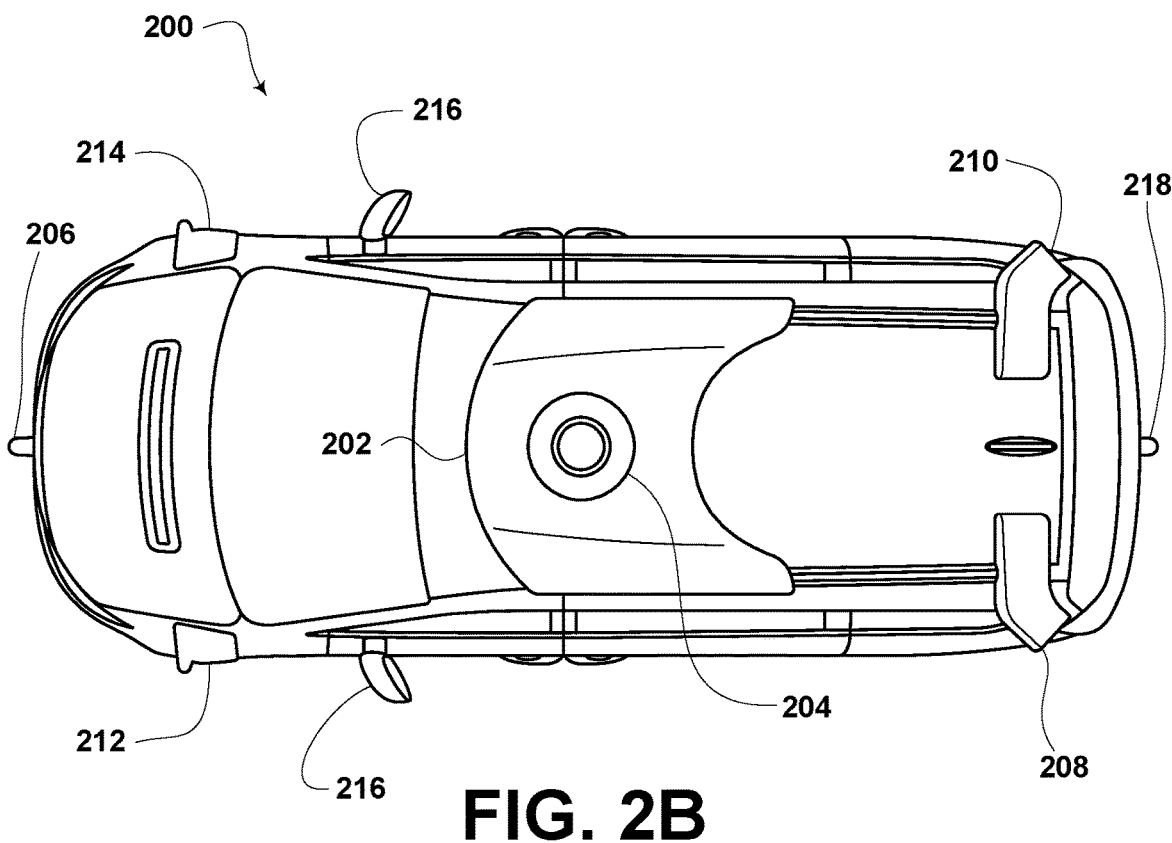
FIG. 2B is an illustration of a physical configuration of a vehicle, according to example embodiments.
Figure 2C:
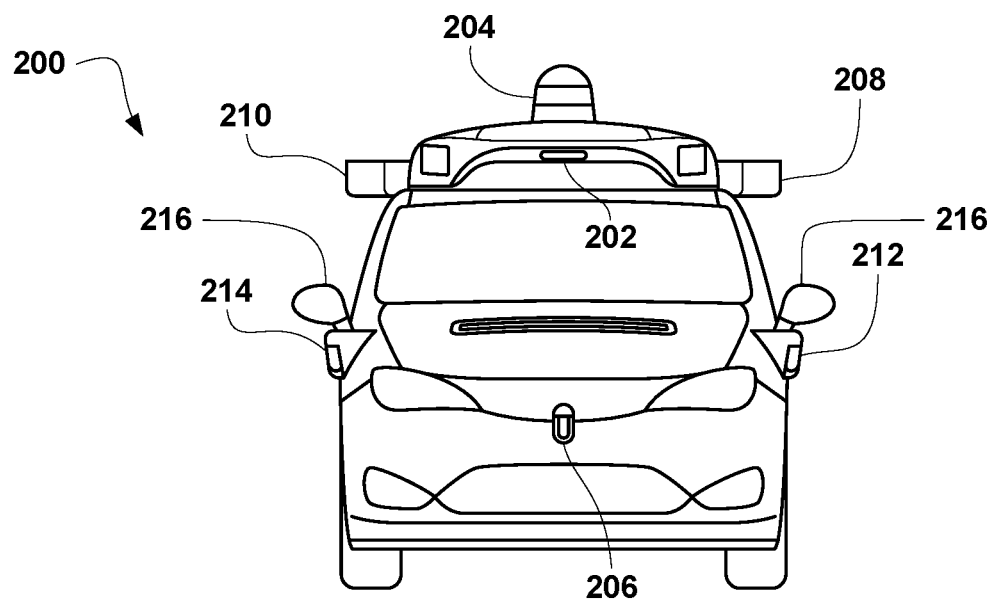
FIG. 2C is an illustration of a physical configuration of a vehicle, according to example embodiments.
Figure 2D:
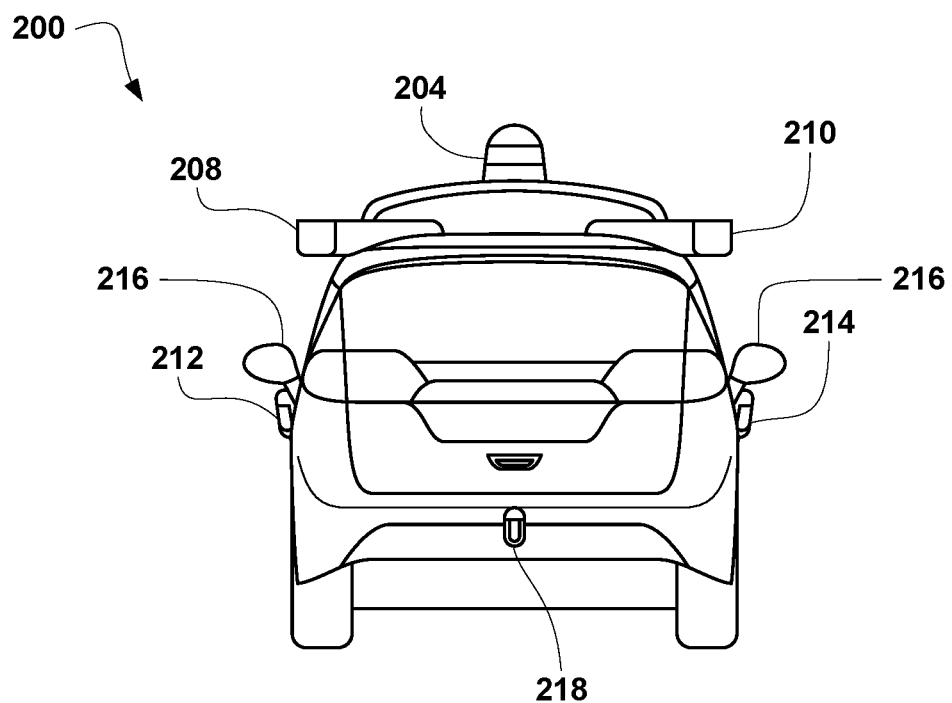
FIG. 2D is an illustration of a physical configuration of a vehicle, according to example embodiments.
Figure 2E:
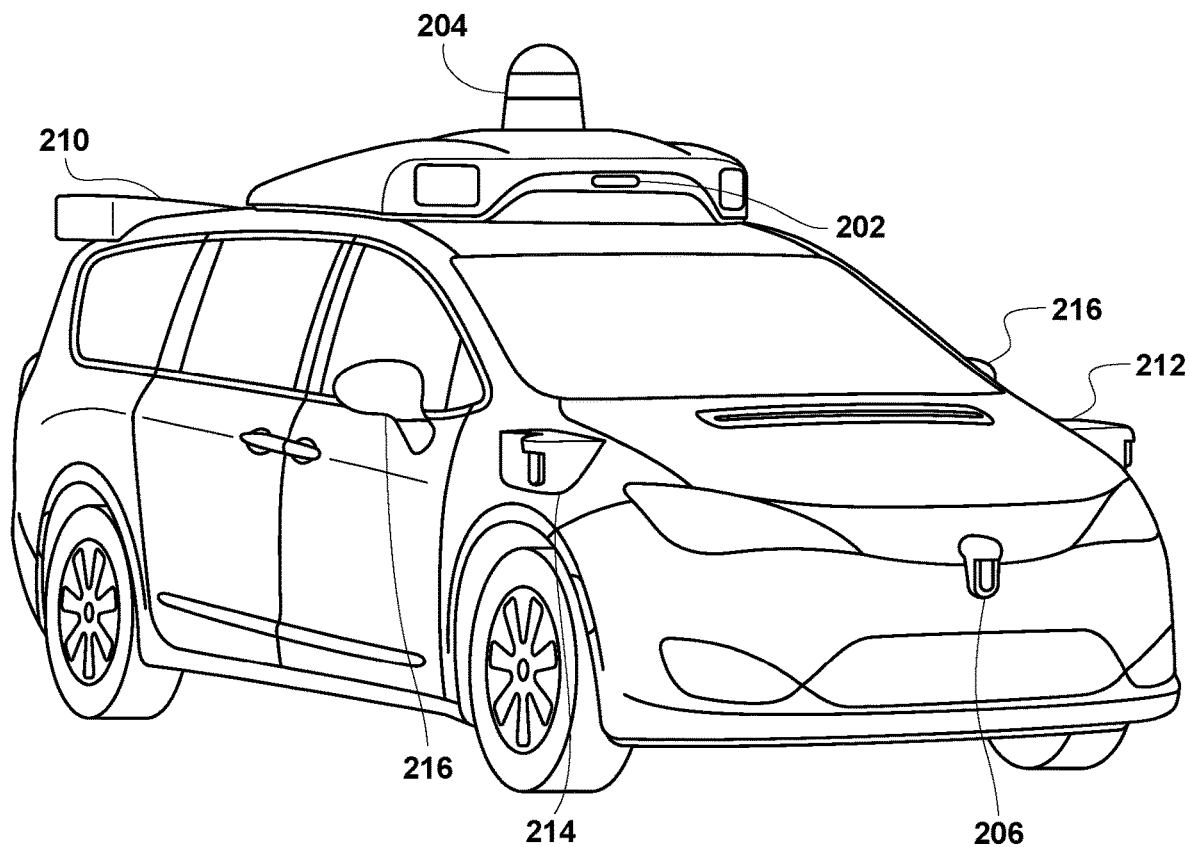
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. And it will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. And some of the illustrated elements may be combined or omitted. Further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, roadway surfaces, buildings, terrain, etc. Additionally, the one or more light emitters could emit light into a local environment of the lidar system itself. For example, light emitted from the one or more light emitters could interact with a housing of the lidar system and/or surfaces or structures coupled to the lidar system. And in some cases, the lidar system could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

A representative lidar system, such as that noted above, may include an optical receiver. The optical receiver includes a plurality of processing chips each configured to accept a plurality of input signals from respective photodetector devices. Each of the processing chips is also configured to output processed data to a common processed data pipeline. That is, multiple chips append data to a data stream carried over the processed data pipeline.

The operations of the processing chips could jointly include the following:

When a lidar shot is taken, all chips process data from their respective channels and internally stage the processed results. Within the context of this disclosure, a channel could include an optical channel that may include one or more light-emitter devices, transmitting optics, receiving optics, and one or more photodetectors. A given channel may correspond to a particular spatial location within the environment and adjacent channels may correspond to adjacent spatial locations. Other types of optical channels are possible and contemplated.

The first chip in the chain generates an output stream that is large enough to hold data from all channels in the system, but only populates the output with data from its local channels, leaving the rest blank.

Each subsequent chip observes the incoming data stream port. When a new data stream arrives, it injects data from its local channels into the right location in the stream, as it flows through. Because the data is flowing through the chip and local channel data is injected on the fly, no buffering of the incoming data is required.

The last chip in the chain (also injecting its local channel data) outputs the fully populated data to the downstream system.

Aside from solving the aggregation issue, this technique also allows for arbitrary output ordering of data from all the chips. For example, consider a 3-chip system, with each chip having 4 channels. If for some reason the 12 physical channels are not nicely arranged in ascending order, the injection process that each chip does to add its channel data to the output stream can be programmed to shuffle accordingly. To accomplish this shuffling without on-the-fly injection and daisy-chaining, a traditional aggregation system would have to buffer data from all attached devices, and then reorder afterwards, requiring large amounts of internal buffers.

In some embodiments, the processed data format could be MIPI-CSI, which is a widely adopted high-speed data protocol for point-to-point image and video transmission between cameras and host devices. In such scenarios, each image line contains data representing processed lidar points from each channel in the system from a single shot. Multiple lines correspond to multiple laser pulse shots, so a 100-line MIPI-CSI image corresponds to data from all channels over 100 shots. While the optical receiver ASIC uses MIPI-CSI as the processed data container, the technique described in the present disclosure is not inherent or specific to the MIPI image format.

Additionally, the plurality of processing chips in the optical receiver could share a common clock. A naive way to store a line of data and find which positions you need to inject data could include waiting for the entire line to load, which requires buffering, before inserting data into the line. Such conventional data storage methods could undesirably increase latency and storage requirements.

However, in the present system and method, each of the processing chips is configured to output locally buffered processed data to a common processed data pipeline. In such a scenario, the chips need not be physically located in a particular manner because entry into the data pipeline can occur in an out-of-order fashion.

In some embodiments, the data stream passing through the data pipeline can be imagined as a train, with specific cars (e.g., data packets) predesignated to house output data from a specific chip.

The plurality of chips could be simultaneously triggered via the common clock to perform various functions. For example, the plurality of chips could: 1) start collecting data from a respective detector; 2) finish collecting data; 3) save locally-collected data in a local buffer; 4) read the data stream until predetermined data location is provided in the data stream; and 5) once predetermined data location is detected, writing locally-collected data into the data stream at the predetermined data location.

In some embodiments, the packet size for the data stream could include 32 16-bit words. However, other packet sizes are possible and contemplated.

Although some embodiments described herein relate to lidar applications, it will be understood that other applications are possible and contemplated. For example, the systems and methods described herein could be applied to other scenarios that include data from multiple data streams that may be incorporated in a deterministic manner into a single, fully-populated data pipeline. Other similar data "multiplexing" applications or operations are possible and contemplated within the context of the present disclosure.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the laser rangefinder/lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor, an application-specific integrated circuit (ASIC), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speed-bumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or laser rangefinder/lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors 216 for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more range finders, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar system could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, range finders, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
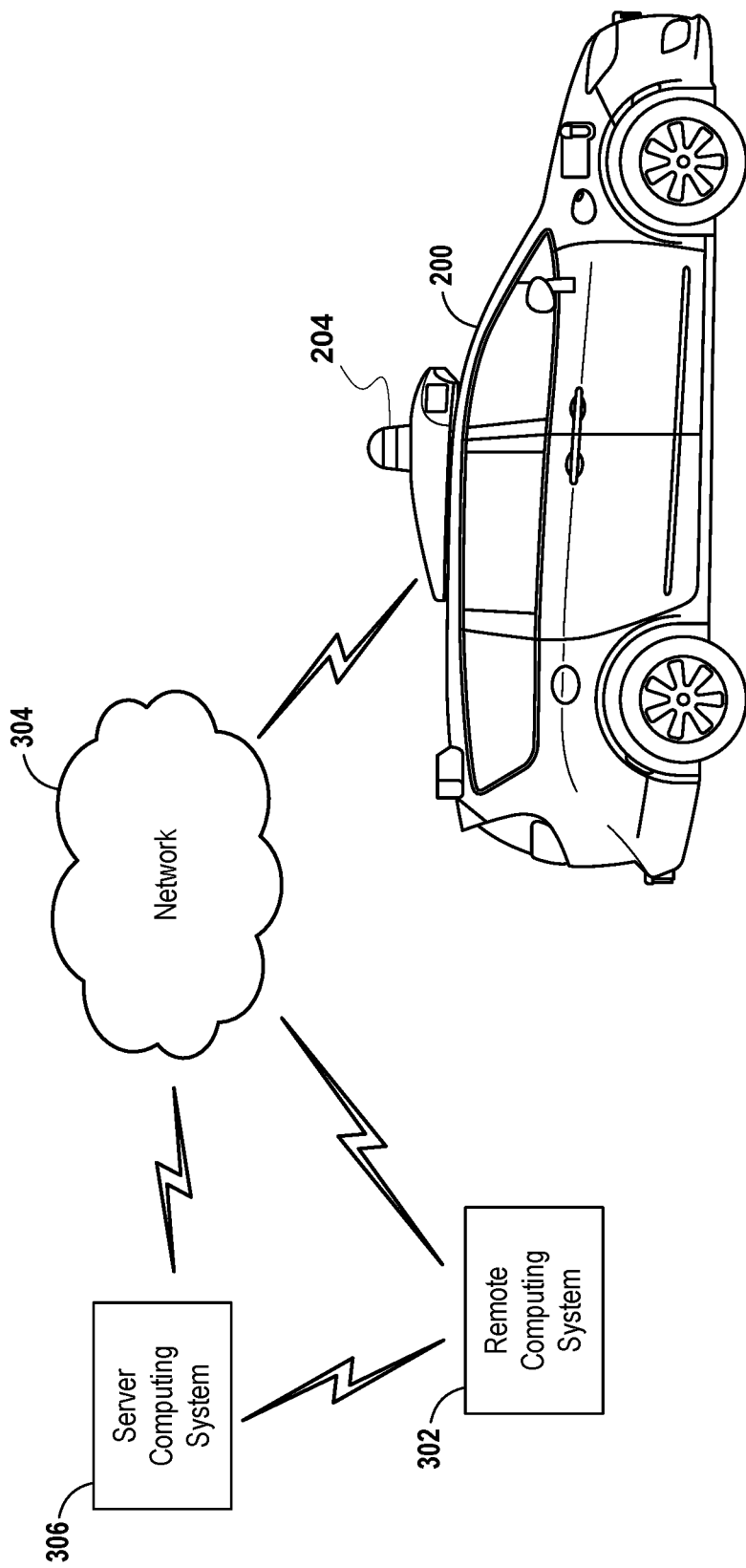
FIG. 3 is a conceptual illustration of wireless communication between various computing systems related to an autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar unit, a laser rangefinder/lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser rangefinder/lidar may be configured to transmit an electromagnetic signal (e.g., infrared light, such as that from a gas or diode laser, or other possible light source) that will be reflected by target objects near the vehicle. The laser rangefinder/lidar may be able to capture the reflected electromagnetic (e.g., infrared light, etc.) signals. The captured reflected electromagnetic signals may enable the range-finding system (or processing system) to determine a range to various objects. The laser rangefinder/lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4A:
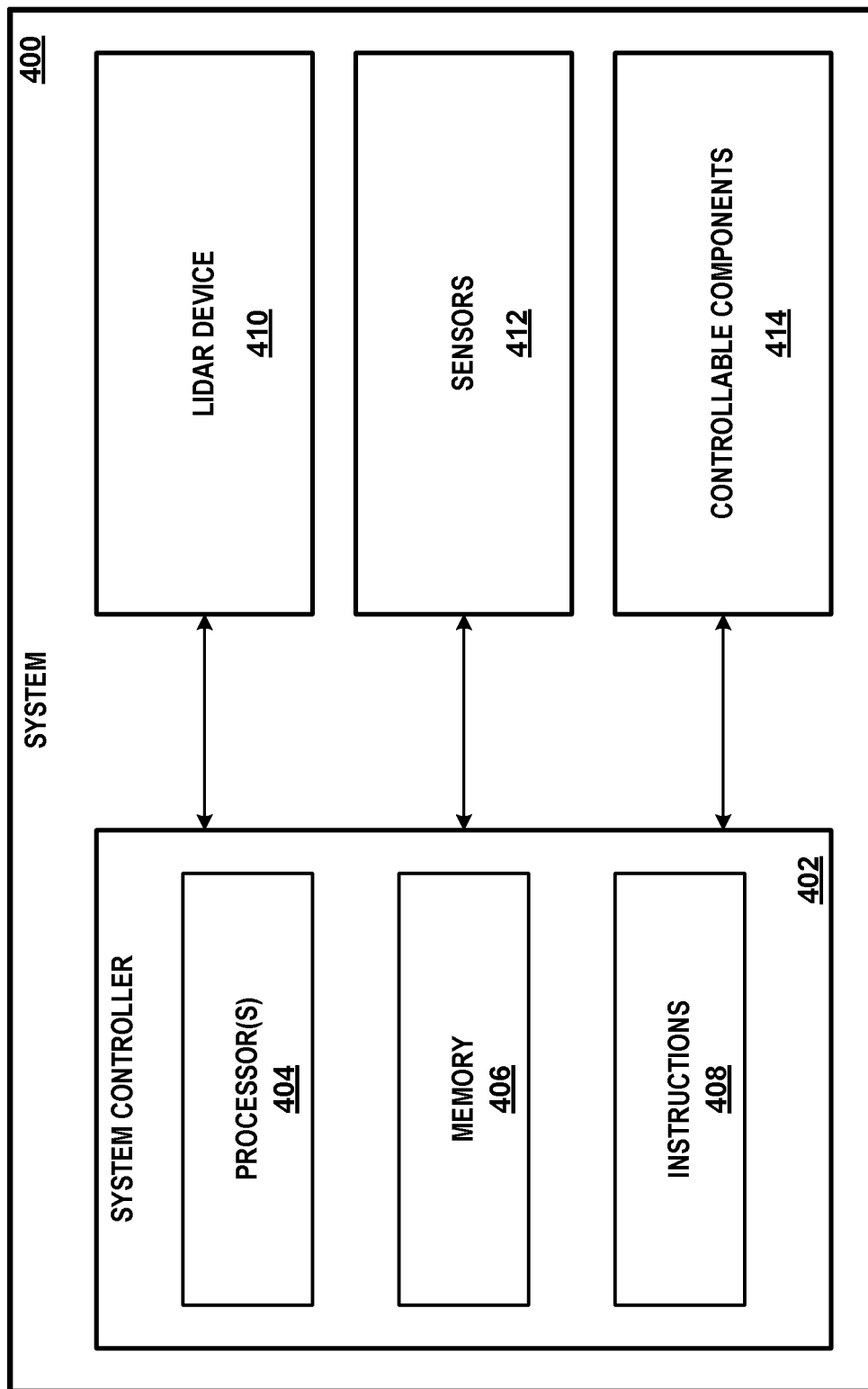
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores, etc.) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory, etc.), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses, etc.) and one or more light detectors configured to detect light (e.g., reflected portions of the light pulses, etc.). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, proximity sensing, etc.).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera, etc.), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode, etc.). Within examples, the lidar device 410 and the sensors 412 are also controllable by the system controller 402.

Figure 4B:
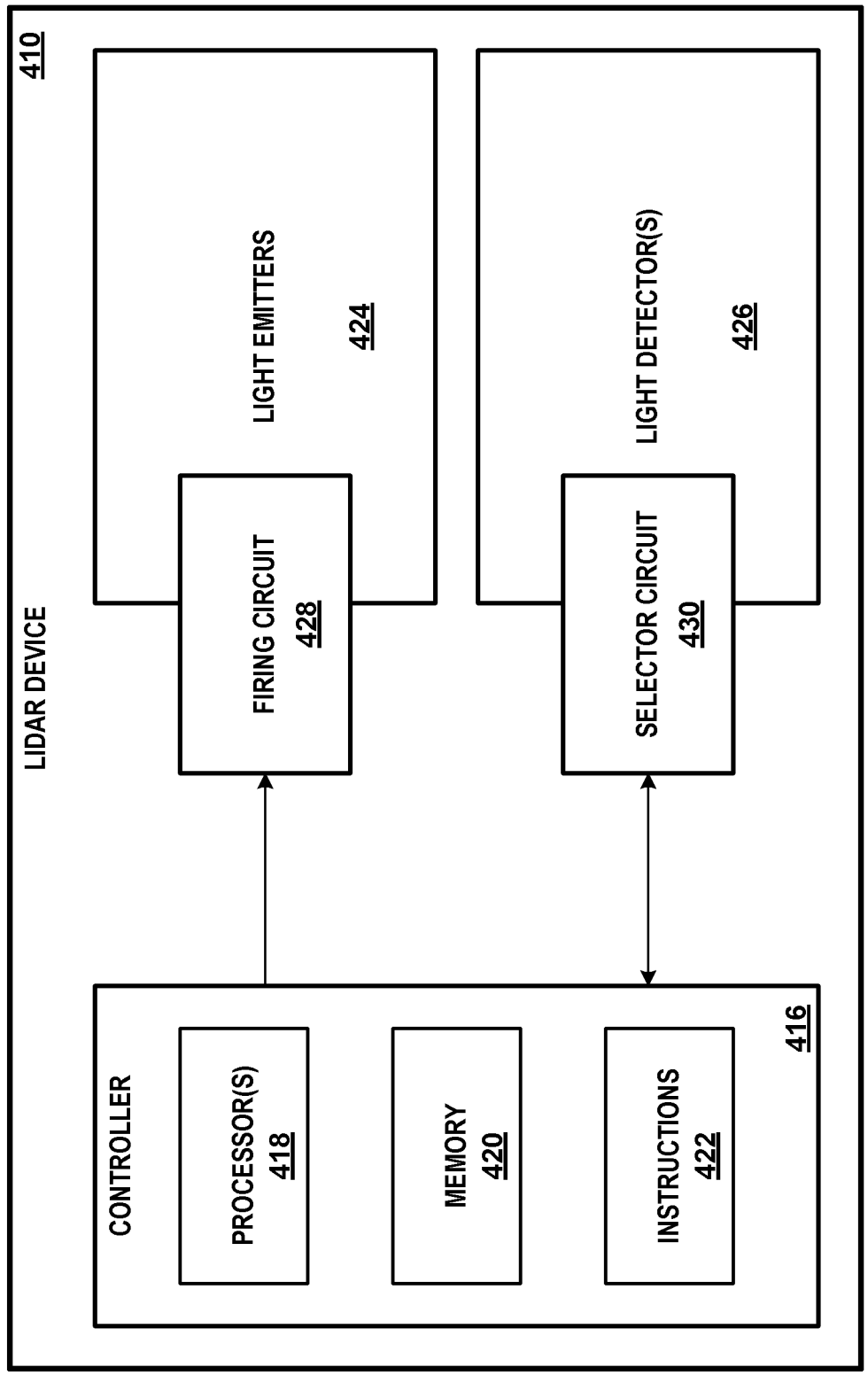
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory, etc.), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, etc. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system, etc.) and intensities of each reflected light pulse.

The firing circuit 428 is used for selecting light emitters for emitting light pulses. The selector circuit 430 similarly is used for sampling outputs from light detectors.

Figure 5:
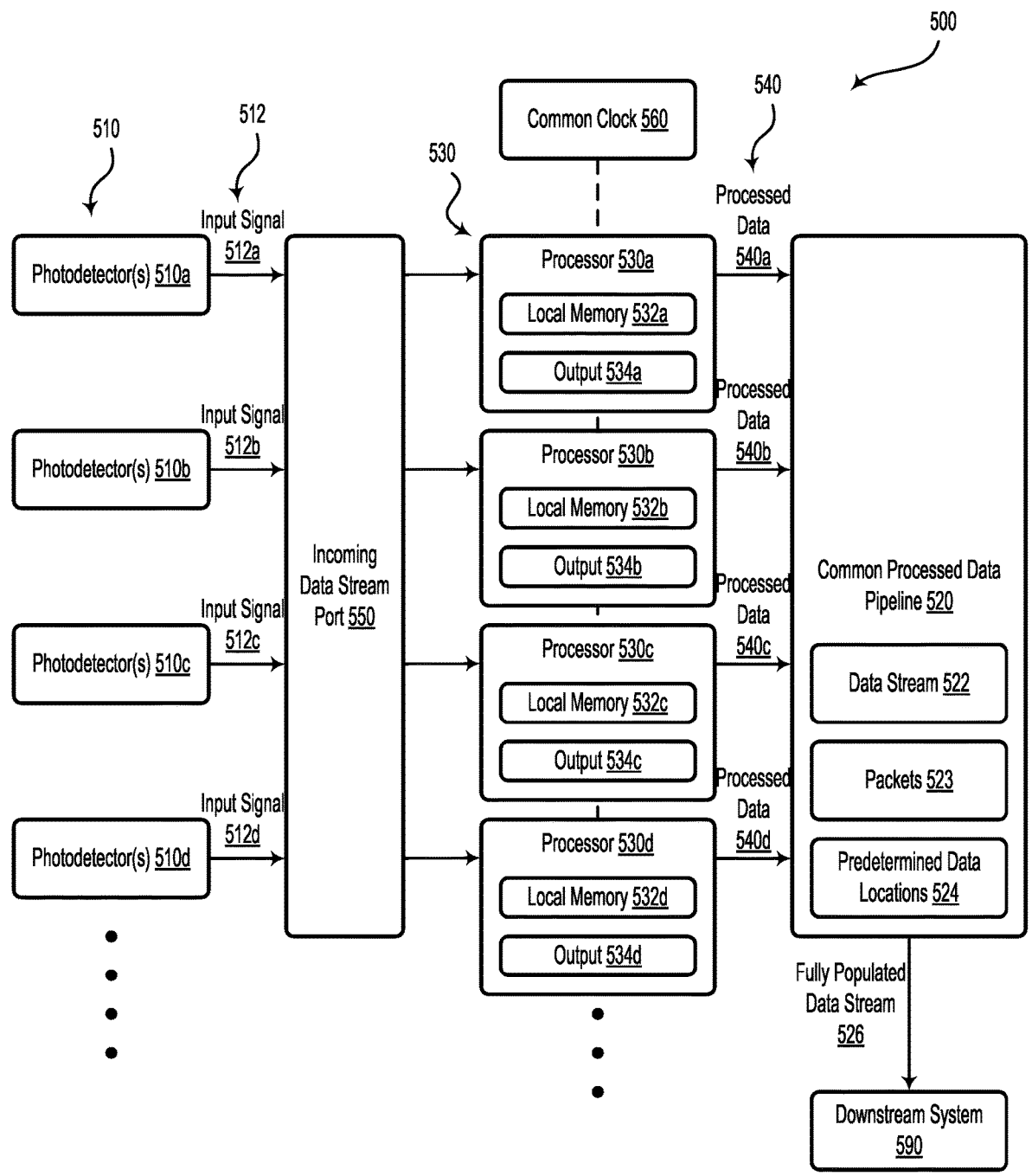
FIG. 5 is a block diagram of an optical receiver, according to example embodiments.

FIG. 5 is a block diagram of an optical receiver 500, according to example embodiments. The optical receiver 500 could be similar or identical to portions of lidar system 128 as illustrated and described in relation to FIG. 1 and/or lidar device 410 as illustrated and described in relation to FIGS. 4A and 4B. In some examples, the optical receiver 500 includes a plurality of photodetectors 510 (e.g., photodetectors 510a, 510b, 510c, and 510d). As described elsewhere herein, the photodetectors 510 could include single photon avalanche photodiodes (SPADs), CMOS photodetectors, TFT photodetectors, and/or other types of photodetectors.

The optical receiver 500 additionally includes a common processed data pipeline 520. In an example embodiment, the common processed data pipeline 520 could include a set of actions and associated hardware that are configured to route data in a data stream from the respective photodetectors 510 to a downstream system 590. The optical receiver 500 also includes a plurality of processors 530 (e.g., processors 530a, 530b, 530c, and 530d). In such scenarios, the outputs (e.g., outputs 534a, 534b, 534c, and 534d) of the plurality of processors 530 are communicatively coupled to the common processed data pipeline 520. In some embodiments, the processors 530 could include a plurality of ASICs, FPGAs, digital signal processors (DSPs), and/or other types of computing devices. For example, processors 530 could include one or more CPUs, one or more microcontrollers, one or more GPUs, or one or more TPUs.

In an example embodiment, each processor 530 (e.g., processor 530a, 530b, 530c, and 530d) is configured to accept input signals 512 (e.g., input signals 512a, 512b, 512c, and 512d) from a respective photodetector of the plurality of photodetectors 510. In some embodiments, accepting the input signals 512 could include accepting the input signals 512 by way of an incoming data stream port 550. Additionally, in some examples, the input signals 512 could be accepted from the incoming data stream port 550 without buffering of the input signals 512.

Furthermore, each processor 530 could be configured to process the input signals 512 to provide processed data 540 (e.g., processed data 540a, 540b, 540c, and 540d). In some examples, processing the input signals 512 may include converting an analog signal from the respective photodetectors 510 to a digital signal at an output of the processor 530.

In such scenarios, each processor 530 is configured to output the processed data 540 into a data stream 522 of the common processed data pipeline 520 according to one or more predetermined data locations 524.

In various examples, each processor 530 could be further configured to internally stage the processed data 540. For example, internally staging the processed data 540 could include storing the processed data 540 in a local memory 532. In some embodiments, the processed data 540 may be stored until the time at which it is output into the data stream 522 at the one or more predetermined data locations 524. In various embodiments, minimal local buffering may be performed to handle out-of-order insertions into the data stream 522. That is, some short-term buffering could be utilized to bridge the time mismatch between when the channels complete processing the processed data and the appropriate data stream slot arriving for processed data insertion into the data stream 522.

In some examples, the processors 530 could be arranged in a chain along the common processed data pipeline 520. In some embodiments, the processors are configured to output their respective processed data 540 into the data stream 522 in a successive fashion based on the arrangement of processors 530 along the chain. In such scenarios, the processor (e.g., processor 530d) in a last location in the chain is further configured to output a fully populated data stream 526 to a downstream system 590. Furthermore, a fully-populated data stream 526 could include a contiguous data stream of processed data 540 from each of the plurality of processors 530. As an example, the downstream system 590 could include a perception system or another type of object recognition or range finding system.

In some examples, the fully populated data stream 526 could be formatted according to high speed data protocol. For example, the high speed data protocol could include the MIPI Camera Serial Interface 2 (MIPI CSI-2). Other streaming data protocols are possible and contemplated.

In example embodiments, the fully populated data stream 526 could include a plurality of packets 523. In some examples, a packet size of each of the packets 523 could be 32 16-bit words. Other packet sizes are possible and contemplated.

In various examples, outputting the processed data 540 into the data stream 522 of the common processed data pipeline 520 could occur in an out-of-order fashion. For example, the processed data 540a from a first processor 530a need not be inserted into the data stream 522 before the processed data 540b from the second processor 530b. Rather, processed data 540a could be interspersed with processed data 540b in the data stream 522. In such a manner, the fully populated data stream 526 could include temporally interspersed packets 523 from the respective processors 530.

In some examples, the plurality of processors 530 could share a common clock 560. In such scenarios, the common clock 560 could include one or more phase-locked loops (PLLs) and/or an off-chip main clock source. In some embodiments, the clock signal could have a frequency in the GHz range (e.g., 1 GHz, 2.5 GHz, 5 GHz, etc.). Other clock frequencies and/or types of clocks or timing triggers are possible and contemplated.

Figure 6A:
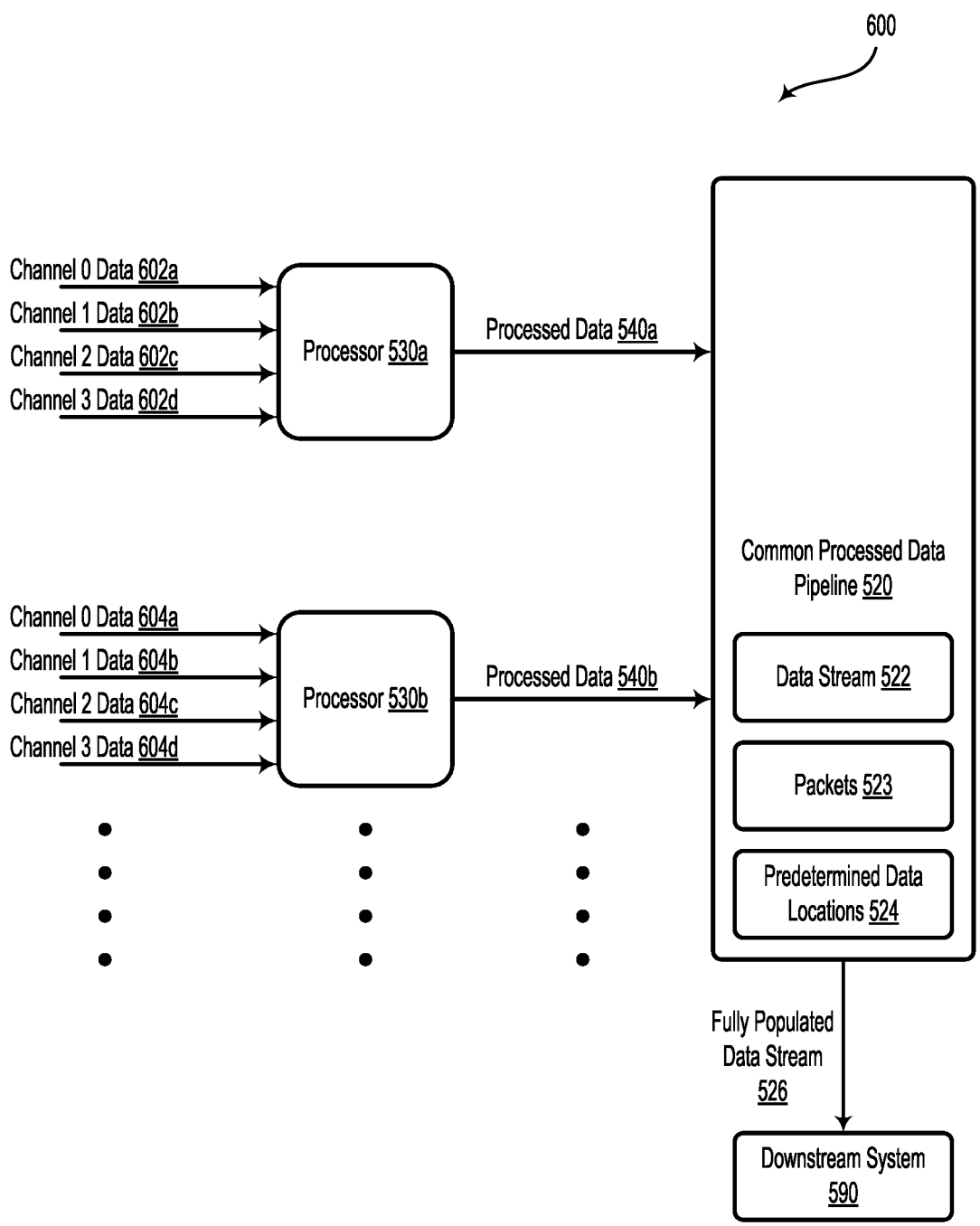
FIG. 6A is a block diagram of an optical receiver, according to example embodiments.

FIG. 6A is a block diagram of an optical receiver 600, according to example embodiments. In some examples, the optical receiver 600 could be similar or identical to the optical receiver 500 as illustrated and described in relation to FIG. 5.

In an example embodiment, each processor 530 (e.g., processor 530a) could include a plurality of input channels configured to provide data from various photodetector channels (e.g., Channel 0 Data 602a, Channel 1 Data 602b, Channel 2 Data 602c, and Channel 3 Data 602d). In such a scenario, the plurality of input channels could include four input channels that each correspond to a respective photodetector of the plurality of photodetectors. In the alternative, 4, 8, 16, 32, or another number of channels could provide input signals for a given processor 530. It will be understood that more or fewer input channels could be used for each processor 530.

Figure 6B:
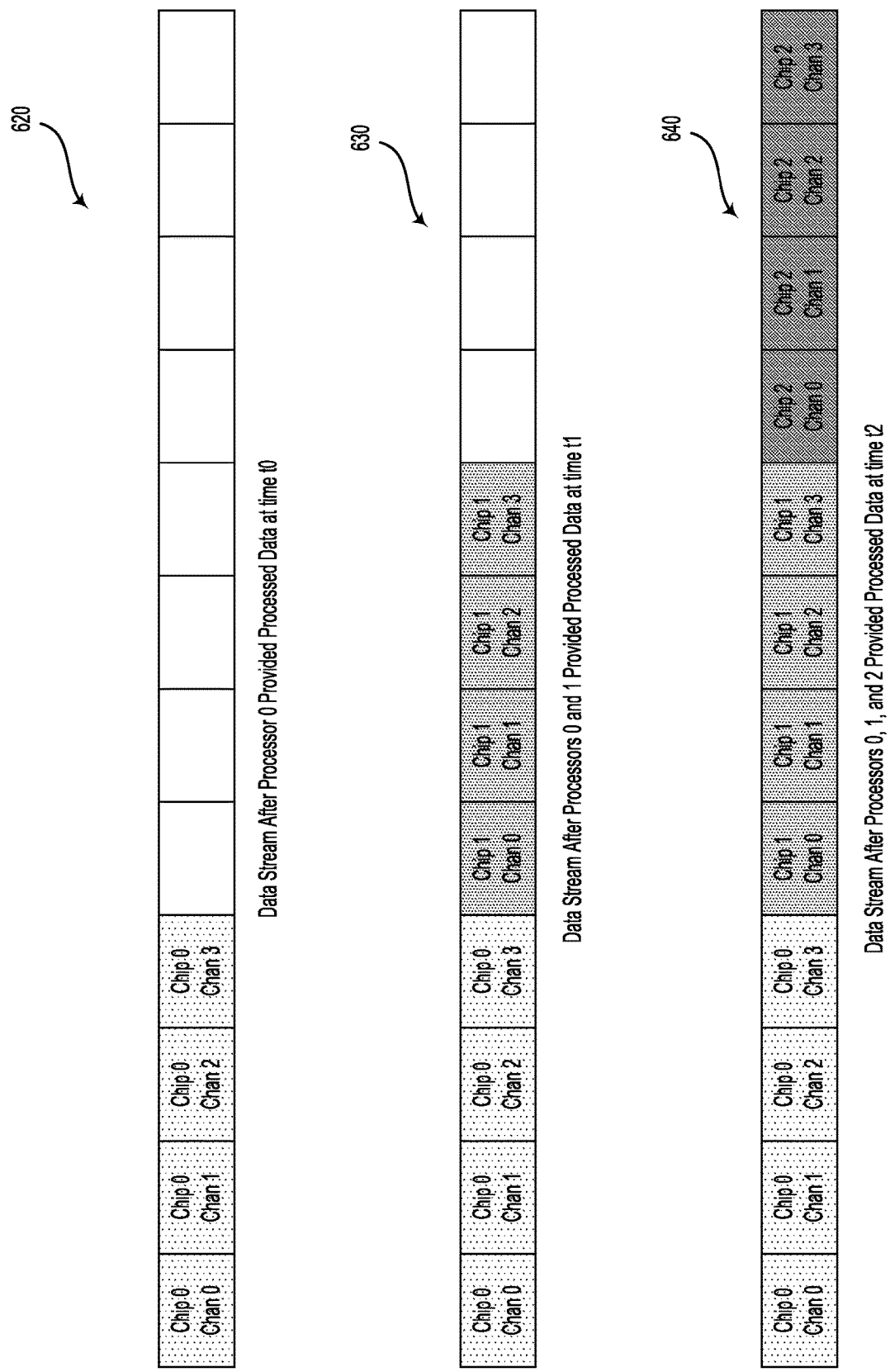
FIG. 6B is a conceptual illustration of a common processed data pipeline, according to example embodiments.

FIG. 6B is a conceptual illustration of a common processed data pipeline 520, according to example embodiments. Data streams 620, 630, and 640 illustrate how processed data from three different processors could be added to the data pipeline 520. At a first time t0, four data packets (e.g., Chip0 Chan0-3) could be added into adjacent data locations along the data stream 620. At a second time t1, four data packets (e.g., Chip1 Chan0-3) could be added into adjacent data locations along the data stream 630 after the initial four data packets (e.g., Chip0 Chan0-3). At a third time t2, four data packets (e.g., Chip2 Chan0-3) could be added into adjacent data locations along the data stream 640 after the initial eight data packets (e.g., Chip0 Chan0-3 and Chip 1 Chan0-3).

Figure 6C:
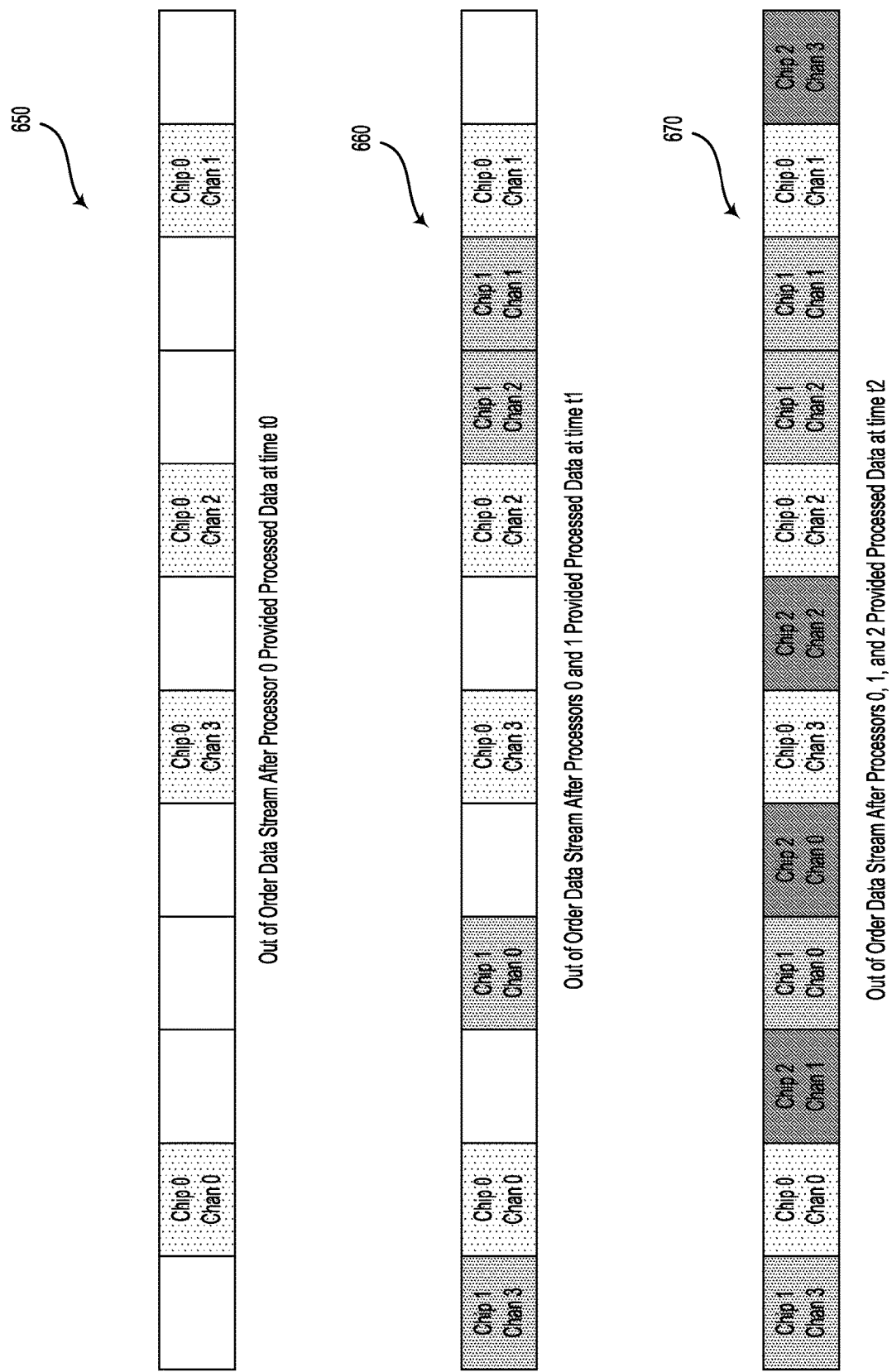
FIG. 6C is a conceptual illustration of a common processed data pipeline, according to example embodiments.

FIG. 6C is a conceptual illustration of a common processed data pipeline 520, according to example embodiments. Out of order data streams 650, 660, and 670 illustrate how processed data from three different processors could be added to the data pipeline 520 in an out-of-order packet arrangement. At a first time t0, four data packets (e.g., Chip0 Chan0-3) could be added into non-adjacent, predetermined data locations along the data stream 620. At a second time t1, four data packets (e.g., Chip1 Chan0-3) could be added into non-adjacent, predetermined data locations along the data stream 660 after the initial four data packets (e.g., Chip0 Chan0-3). At a third time t2, four data packets (e.g., Chip2 Chan0-3) could be added into non-adjacent, predetermined data locations along the data stream 670 after the initial eight data packets (e.g., Chip0 Chan0-3 and Chip1 Chan0-3).

Figure 7:
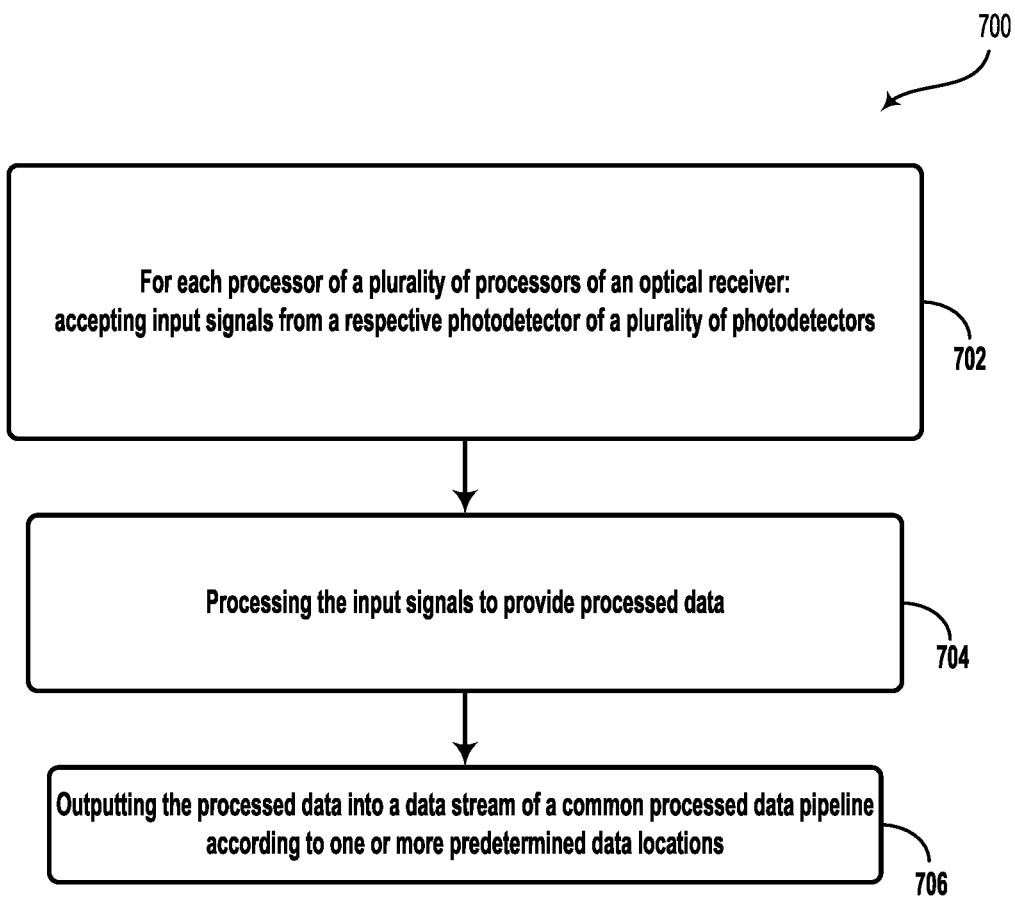
FIG. 7 is a flow chart depicting a method, according to example embodiments.

FIG. 7 is a flow chart depicting a method 700, according to example embodiments. While method 700 illustrates several blocks of a method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 700 may be carried out so as to operate the lidar 128, lidar device 410, or optical receiver 500, as illustrated and described in reference to FIG. 1, FIGS. 4A and 4B, and FIG. 5, respectively.

Block 702 includes, for each processor of a plurality of processors (e.g., processors 530) of an optical receiver (e.g., optical receiver 500), accepting input signals (e.g., input signals 512) from a respective photodetector of a plurality of photodetectors (e.g., photodetectors 510).

Block 704 includes that each processor may also process the input signals to provide processed data (e.g., processed data 540). In an example embodiment, the processed data 540 could include information indicative of a brightness or amplitude of a return light pulse.

Block 706 includes outputting the processed data into a data stream (e.g., data stream 522) of a common processed data pipeline (e.g., common processed data pipeline 520) according to one or more predetermined data locations (e.g., predetermined data locations 524) in the data stream. In some examples, outputting the processed data into the data stream of the common processed data pipeline could occur in an out-of-order fashion.

Method 700 may additionally include internally staging the processed data (e.g., within local memory 532a-d) until the processed data is output into the data stream at the one or more predetermined data locations. As described elsewhere herein, the input signals could be processed, the processed data may be stored, and the processed data may be inserted into the data stream of the common processed data pipeline according to signals from the common clock (e.g., common clock 560).

In some examples, the processors could be arranged in a physical or virtual chain along the common processed data pipeline. In such scenarios, the processors could be configured to output their respective processed data into the data stream in a successive fashion based on the arrangement of processors in the chain. For example, a processor (e.g., processor 530d) in a last location in the chain is further configured to output a fully populated data stream (e.g., fully populated data stream 526) to a downstream system (e.g., downstream system 590).

In some examples, the fully populated data stream could be formatted according to high speed data protocol. In such scenarios, the high speed data protocol could be MIPI Camera Serial Interface 2 (MIPI CSI-2). Other data protocols and formats are possible and contemplated.

In some embodiments, various blocks of method 700 could be initiated based on a common clock signal. In such scenarios, the plurality of processors could share a common clock (e.g., common clock 560). At least a portion of the method steps are performed in a synchronized manner across each of the processors.

Operable aspects of the optical receivers and the corresponding methods described herein could be carried out and/or executed by way of a non-transitory computer-readable medium having encoded thereon instructions executable to carry out operations. Namely, the non-transitory computer-readable medium could be operable for providing a fully populated data stream in a common processed data pipeline based on outputs from a plurality of processors. In such scenarios, the operations could include, for each processor of the plurality of processors, accepting input signals from a respective photodetector of a plurality of photodetectors. The operations may additionally include processing the input signals to provide processed data. The operations may further include outputting the processed data into a data stream of the common processed data pipeline according to one or more predetermined data locations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

Further, the present disclosure also contemplates a non-transitory computer readable medium having encoded thereon instructions executable by one or more processors to carry out operations as described herein. Without limitation, for instance, the non-transitory computer-readable medium could implemented with a GPU, a CPU, a TPU, an ASIC, an FPGA, a digital signal processor (DSP) and/or distributed among multiple GPUs, CPUs, TPUs, ASICs, FPGAs, DSPs, and/or other computing modules.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:
1. An optical receiver comprising:
a plurality of photodetectors;
a common processed data pipeline; and
a plurality of processors, wherein outputs of the plurality of processors are communicatively coupled to the common processed data pipeline, each processor configured to:
  accept input signals from a respective photodetector of the plurality of photodetectors;
  process the input signals to provide processed data; and
  output the processed data into one or more predetermined data locations of a data stream of the common processed data pipeline.
2. The optical receiver of claim 1, wherein each processor is further configured to internally stage the processed data until the processed data is output into the data stream at the one or more predetermined data locations.
3. The optical receiver of claim 1, wherein accepting the input signals comprises accepting the input signals by way of an incoming data stream port.
4. The optical receiver of claim 3, wherein the input signals are accepted from the incoming data stream port without buffering of the input signals.
5. The optical receiver of claim 1, wherein the processors are arranged in a chain along the common processed data pipeline, such that the processors are configured to output their respective processed data into the data stream in a successive fashion based on the arrangement of processors in the chain.
6. The optical receiver of claim 5, wherein a processor in a last location in the chain is further configured to output a fully populated data stream to a downstream system.
7. The optical receiver of claim 6, wherein the fully populated data stream is formatted according to a high speed data protocol.
8. The optical receiver of claim 7, wherein the high speed data protocol comprises MIPI Camera Serial Interface 2 (MIPI CSI-2).
9. The optical receiver of claim 6, wherein the fully populated data stream comprises a plurality of packets, wherein a packet size of each of the packets comprises (32) (16-bit) words.
10. The optical receiver of claim 1, wherein outputting the processed data into the data stream of the common processed data pipeline occurs in an out-of-order fashion.
11. The optical receiver of claim 1, wherein the plurality of processors share a common clock.
12. The optical receiver of claim 1, wherein each processor comprises a plurality of input channels.
13. A method comprising:
accepting, at a processor of a plurality of processors of an optical receiver, input signals from a respective photodetector of a plurality of photodetectors;
processing the input signals to provide processed data; and
outputting the processed data into one or more predetermined data locations of a data stream of a common processed data pipeline.
14. The method of claim 13, further comprising:
internally staging the processed data until the processed data is output into the data stream at the one or more predetermined data locations.
15. The method of claim 13, wherein the plurality of processors are arranged in a chain along the common processed data pipeline, such that the processors are configured to output their respective processed data into the data stream in a successive fashion based on the arrangement of processors in the chain.
16. The method of claim 15, wherein a processor in a last location in the chain is further configured to output a fully populated data stream to a downstream system.
17. The method of claim 16, wherein the fully populated data stream is formatted according to high speed data protocol.
18. The method of claim 17, wherein the high speed data protocol comprises MIPI Camera Serial Interface 2 (MIPI CSI-2).
19. The method of claim 13, wherein outputting the processed data into the data stream of the common processed data pipeline occurs in an out-of-order fashion.
20. A non-transitory computer-readable medium having encoded thereon instructions executable to carry out operations for providing a fully populated data stream in a common processed data pipeline based on outputs from a plurality of processors, the operations comprising, for each processor of the plurality of processors:

accepting input signals from a respective photodetector of a plurality of photodetectors;

processing the input signals to provide processed data; and outputting the processed data into a data stream, according to one or more predetermined data locations.

* * * * *